United States Patent
Liao et al.

(10) Patent No.: US 7,252,697 B2
(45) Date of Patent: Aug. 7, 2007

(54) METHODS FOR MAKING CONTROLLED-RELEASE AMMONIUM PHOSPHATE FERTILIZER

(75) Inventors: Zongwen Liao, Tianhe (CN); Song Bo, Tianhe (CN); Xiaoyun Mao, Tianhe (CN); Ping-Xiao Guan, Tianhe (CN)

(73) Assignee: South China Agricultural University, Tianhe, Guangzhou (CN)

( * ) Notice: Subject to any disclaimer, the term of this patent is extended or adjusted under 35 U.S.C. 154(b) by 155 days.

(21) Appl. No.: 10/613,563

(22) Filed: Jul. 2, 2003

(65) Prior Publication Data

US 2004/0003636 A1  Jan. 8, 2004

(30) Foreign Application Priority Data

Jul. 5, 2002  (CN) ................. 02 1 34302

(51) Int. Cl.
*C05B 15/00* (2006.01)

(52) U.S. Cl. ............... 71/34; 71/33; 71/64.08; 71/64.11

(58) Field of Classification Search ............ 71/33, 71/34, 64.08, 64.11
See application file for complete search history.

(56) References Cited

U.S. PATENT DOCUMENTS

| 3,179,496 | A | * | 4/1965 | Skinner et al. | ............. | 423/275 |
| 3,354,096 | A | * | 11/1967 | Young | ............. | 502/73 |
| 4,695,387 | A | * | 9/1987 | Berry et al. | ............. | 210/676 |
| 4,846,871 | A | * | 7/1989 | Detroit | ............. | 71/25 |
| 5,041,153 | A | * | 8/1991 | Detroit | ............. | 71/25 |
| 5,360,465 | A | * | 11/1994 | Buchholz et al. | ............. | 71/11 |
| 5,366,534 | A | * | 11/1994 | Fischbein et al. | ............. | 71/63 |
| 2004/0099027 | A1 | * | 5/2004 | Rohwer | ............. | 71/31 |

FOREIGN PATENT DOCUMENTS

| CN | 1163250 | * | 10/1997 |
| RU | 2165912 | * | 4/2001 |

* cited by examiner

*Primary Examiner*—C. Sayala
(74) *Attorney, Agent, or Firm*—patenttm.us; James H. Walters

(57) ABSTRACT

A method for making controlled-release ammonium phosphate fertilizer has the following acts of: cracking, pulverizing, blending, aging, drying, and adding release-controlling materials into an ammonium phosphate slurry during preparing processes or adding release-controlling materials in achieved ammonium phosphate powder. Selectively, sulfuric acid is added into the mixture of the release-controlling materials and the ammonium phosphate slurry or ammonium phosphate powder to acidify the mixture. In this method, the release-controlling material combines with the ammonium phosphate by chemical bonding to control the release of nitrogen and phosphorus nutrients to enhance the use efficiency and elongate fertilization effect of the controlled-release ammonium phosphate fertilizer. Additionally, manufacturing equipment of the present invention are basically the same with the equipment manufacturing the conventional ammonium phosphate fertilizer and the raw materials such as release-controlling materials are easily obtained for free, no extra manufacturing and product cost increase in the present invention.

9 Claims, No Drawings

METHODS FOR MAKING CONTROLLED-RELEASE AMMONIUM PHOSPHATE FERTILIZER

BACKGROUND OF THE INVENTION

1. Field of the Invention

The present invention relates to methods for making ammonium phosphate fertilizer, and more particularly to methods for making controlled-release ammonium phosphate fertilizer that releases nutrient continuously and efficiently to the soil.

2. Description of Related Arts

Ammonium phosphate is a main compound fertilizer containing nitrogen and phosphorus, two basal nutrients for plants, and takes a 58% marketing proportion of all phosphate fertilizers in the world. Ammonium phosphate is used as a base fertilizer or an additional fertilizer, and more likely to be used as a main component of a bulk blend fertilizer or compound fertilizer since the ammonium phosphate has excellent compatibility to match in harmony with other different fertilizers. Ammonium phosphate and other phosphate fertilizers such as superphosphate, triple superphosphate, nitrophosphate, and calcium magnesium phosphate have a fatal drawback in that most of the phosphate is easily fixed in soil and become too slow-released or unavailable. Therefore, the phosphorous fertilizers are not efficient for a long period of time and are not completely absorbed by plants resulting in low use efficiency of the phosphorous fertilizers as 15-20% in the growth season of plants.

The present invention has arisen to mitigate or obviate the disadvantages of the conventional phosphate fertilizers.

SUMMARY OF THE INVENTION

A first objective of the present invention is to provide methods for making controlled-release ammonium phosphate fertilizer that has an excellent use efficiency and low producing cost.

A second objective of the present invention is to provide methods for making ammonium phosphate fertilizer that uses agricultural waste as release-controlling materials to reduce product cost of the ammonium phosphate fertilizer and to enhance the use efficiency.

A third objective of the present invention is to provide methods for making ammonium phosphate fertilizer that does not need additional new manufacturing equipment whereby the fertilizer is, prepared economically. Further benefits and advantages of the present invention will become apparent after a careful reading of the detailed description.

DETAILED DESCRIPTION OF THE PREFERRED EMBODIMENT

Methods for making controlled-release ammonium phosphate fertilizer in accordance with the present invention comprises the following acts of: cracking, pulverizing, blending, aging, drying, and adding release-controlling materials into ammonium phosphate slurry during making processes or adding release-controlling materials in dried ammonium phosphate product.

The detailed description of the method is illustrated as following:

(A) Adding cracked release-controlling materials into ammonium phosphate slurry before condensing the ammonium phosphate slurry in proportion of 3~35% (w/w, based on a dry weight of the ammonium phosphate slurry);

mixing evenly the ammonium phosphate slurry and the release-controlling materials into a mixture;

condensing the mixture of the ammonium phosphate slurry and the release-controlling materials until a water-content rate of the mixture decreases to 25~35%; and granulating the condensed mixture of ammonium phosphate slurry and the release-controlling materials to obtain granular ammonium phosphate fertilizer, wherein granulating methods are selected from following methods comprising: slurry granulating, spray granulating, or fluidization granulating.

(B) Adding cracked release-controlling materials into ammonium phosphate slurry before condensing the ammonium phosphate slurry in proportion of 3~35% (w/w, based on the dry weight of the ammonium phosphate slurry);

mixing evenly the ammonium phosphate slurry and the release-controlling materials into a mixture;

adding sulfuric acid into the mixture for acidification in proportion of 1-20% (w/w, based on the dry weight of the ammonium phosphate slurry);

condensing the acidified mixture of the ammonium phosphate slurry and the release-controlling materials until a water-content rate of the mixture decreases to 25~35%; and granulating the condensed mixture of ammonium phosphate slurry and the release-controlling materials to obtain granular ammonium phosphate fertilizer, wherein granulating methods are selected from the following methods comprising: slurry granulating, spray granulating, or fluidization granulating.

(C) Adding cracked release-controlling material and water into the dried ammonium phosphate powder, wherein the cracked release-controlling material is in the proportion of 3~35% (w/w, based on a dry weight of the ammonium phosphate powder) and the water is in the proportion of 3~40% (w/w, based on the dry weight of the ammonium phosphate powder);

mixing evenly the ammonium phosphate powder, the release-controlling material and water into a mixture;

thoroughly grinding the mixture;

activating components in the mixture by stacking; and drying the activated mixture to achieve the controlled-release ammonium phosphate fertilizer.

(D) Adding cracked release-controlling material and water into the dried ammonium phosphate powder, wherein the cracked release-controlling material is in the proportion of 3~35% (w/w, based on the dry weight of the ammonium phosphate powder) and the water is in the proportion of 3~40% (w/w, based on the dry weight of the ammonium phosphate powder);

mixing evenly the ammonium phosphate powder, the release-controlling material and water into a mixture;

thoroughly grinding the mixture;

adding sulfuric acid into the mixture to acidify the mixture in the proportion of 1-20% (w/w, based on the dry weight of the ammonium phosphate powder);

activating the mixture to mature in an activating chamber to become a flesh fertilizer; and drying the flesh fertilizer to achieve the controlled-release ammonium phosphate fertilizer.

The release-controlling material is selected from at least one of the group comprising: zeolite, montmorillonite, pillared montmorillonite, and lignin comprising alkali lignin and lignosulfonate or lignosulphonate. The release-controlling material used in methods (C) and (D) having acidifying acts is selected from at least one of the group comprising: acidified zeolite, acidified montmorillonite, acidified pillared montmorillonite, acidified lignin comprising acidified alkali lignin and acidified lignosulfonate or lignosulphonate. The release-controlling material is pulverized to particles of 0.2-0.04 mm mesh.

One or more release controlling materials mentioned above can be added in the processes of manufacturing ammonium phosphate fertilizer, the total amount of release-controlling materials still take 3-35% weight percentage based on the dry weight of the ammonium phosphate.

Species of the release-controlling material such as zeolite, montmorillonite smectite, pillared montmorillonite, acidification zeolite, acidification montmorillonite, acidification pillared montmorillonite, are inorganic and have excellent ion exchanging capability to cause chemical bonding with the $NH_4^+$ and $H_2PO_4^-$ in the ammonium phosphate and to cause complexing with $H_2PO_4^-$.

Species of the release-controlling material such as lignin and acidification lignin are organic and have complex three-dimensional netting structures and multiple functional groups such as hydroxyl, carboxyl, and amine. These functional groups of the organic release-controlling materials cause chemical bonding with $NH_4^+$ and $H_2PO_4^-$ group of the ammonium phosphate and also cause complexing with $H_2PO_4^-$. The physio-chemical interactions between the release-controlling materials and the ammonium phosphate reduce the crystallinity of the ammonium phosphate to enhance the capabilities of anti-fixation and anti-leaching so as to result in long lasting fertilization effect and higher nutrient use efficiency.

Since the release-controlling material combines with the ammonium phosphate by chemical bonding and complexing, nitrogen and phosphorus nutrients are slowly released corresponding to the plants absorption for whole growth season. Thus, the nitrogen and phosphorus nutrients are not wasted in soil fixation and the use efficiency increases.

The following examples are embodiments in accordance with the present invention. Examples 1 to 4 are to add release-controlling material during manufacturing process of ammonium phosphate slurry and examples 5-8 are to add release-controlling material into dried ammonium phosphate powder.

EXAMPLE 1

100 tons of ammonium phosphate slurry with 55~65% water-content rate is mixed with 4.5~3.5 tons of 0.16 mm mesh zeolite (or montmorillonite or pillared montmorillonite or lignin) in an evaporator. The mixture of the ammonium phosphate slurry and the zeolite is stirred evenly and then condensed to reduce the water-content rate until it reaches 25~35%. Lastly, the condensed mixture is dried to make controlled-release ammonium phosphate in forms of powder and particles by slurry granulating, spray granulating, or fluidization granulating.

EXAMPLE 2

100 tons of ammonium phosphate slurry with 55~65% water-content rate is mixed with 3.6~2.8 tons of 0.16 mm mesh acidified zeolite (or acidified montmorillonite or acidified pillared montmorillonite or acidified lignin)in an evaporator. The mixture of the ammonium phosphate slurry and the acidified zeolite is stirred evenly and then condensed to reduce the water-content rate until it reaches 25~35%. Lastly, the condensed mixture is dried to make controlled-release ammonium phosphate in forms of powder and particles by slurry granulating, spray granulating, or fluidization granulating.

EXAMPLE 3

100 tons of ammonium phosphate slurry with 55~65% water-content rate is mixed with 2.8~3.6 tons of 0.16 mm mesh acidified zeolite (or acidified montmorillonite or acidified pillared montmorillonite or acidified lignin) and 2.1~2.7 tons of sulfuric acid in an evaporator. The mixture of the ammonium phosphate slurry, the acidified zeolite and sulfuric acid is stirred evenly and then condensed to reduce the water content rate until it reaches 25~35%. Lastly, the condensed mixture is dried to make controlled-release ammonium phosphate in forms of powder and particles by slurry granulating, spray granulating, or fluidization granulating.

EXAMPLE 4

100 tons of ammonium phosphate slurry with 55~65% water-content rate is mixed with 2.8~3.6 tons of 0.16 mm mesh zeolite (or montmorillonite or pillared montmorillonite or lignin) and 2.1~2.7 tons of sulfuric acid in an evaporator. The mixture of the ammonium phosphate slurry, the zeolite and sulfuric acid is stirred evenly and then condensed to reduce the water-content rate until it reaches 25~35%. Lastly, the condensed mixture is dried and granulated to make controlled-release ammonium phosphate in forms of powder and particles by slurry granulating, spray granulating, or fluidization granulating.

EXAMPLE 5

100 tons of smashed ammonium phosphate powder is mixed with 10 tons of 0.16 mm mesh zeolite (or montmorillonite or pillared montmorillonite or lignin) and 8 tons of water. The mixture of the smashed ammonium phosphate, the zeolite and water is thoroughly stirred and ground evenly and then the mixture is piled for 1~3 days for activation. Lastly, the activated mixture is dried to make controlled-release ammonium phosphate particles.

EXAMPLE 6

100 tons of smashed ammonium phosphate powder is mixed with 10 tons of 0.16 mm mesh acidified zeolite (or acidified montmorillonite or acidified pillared montmorillonite or acidified lignin) and 8 tons of water. The mixture of the smashed ammonium phosphate, the acidified zeolite and water is thoroughly stirred and ground evenly and then the mixture is piled for 1~3 days for activation. Lastly, the activated mixture is dried to make controlled-release ammonium phosphate particles.

EXAMPLE 7

100 tons of smashed ammonium phosphate powder is mixed with 8 tons of 0.16 mm mesh zeolite (or montmorillonite or pillared montmorillonite or lignin) and 8 tons of water. The mixture of the smashed ammonium phosphate, the zeolite and water is thoroughly stirred and ground evenly. 5 tons of sulfuric acid is added into the mixture to acidify the mixture in a mixer. Then the acidified mixture is activated in an activating chamber and matured to become flesh fertilizer. Lastly, the flesh fertilizer is dried into the controlled-release ammonium phosphate product.

EXAMPLE 8

100 tons of smashed ammonium phosphate powder is mixed with 4 tons of zeolite, 3 tons of 0.16 mm mesh lignin and 8 tons of water. The mixture of the smashed ammonium phosphate, the zeolite, lignin and water is thoroughly stirred and ground evenly. 5 tons sulfuric acid is added into the mixture to acidify the mixture in a mixer. Then, the acidified mixture is activated in the activating chamber and matured to become flesh fertilizer. Lastly, the flesh fertilizer is dried into the controlled-release ammonium phosphate product.

Product analysis:

1. Structure analysis: X-ray diffraction is used to verify the structure of the controlled-release ammonium phosphate. In comparison with the conventional ammonium phosphate fertilizer, the controlled-release ammonium phosphate fertilizer has lower crystallization. Infrared spectrum is used to check chemical bonding and finds that featuring peaks of $NH_4^+$ and $H_2PO_4^-$ decay and have variations of generating new diffracting peaks at 0.3292 nm and 0.3366 nm.

2. Anti-fixing capability in soil:

0.5 g of controlled-release ammonium phosphate fertilizer is applied to 400 g of soil and-water is added to the soil to keep the soil damp. The fertilized soil is cultured for 2~5 days and then shacked in 800 mL of water for 6 hours. Suspension of the fertilized soil is filtered and the solution is tested to qualify phosphorus content. The filtered soil is tested to qualify available phosphorus content and water-dissolvable phosphorus content in the fertilized soil. Conventional ammonium phosphate is treated in the same way to be a comparison test. In result, the phosphorus content of the filtered liquid and available phosphorus content and water-dissolvable phosphorus content in the soil of the controlled-release ammonium phosphate fertilizer are higher than ones of the conventional ammonium phosphate fertilizer.

CONCLUSION

The controlled-release ammonium phosphate fertilizer was applied to a maize laterite field in equal weight with the conventional ammonium phosphate fertilizer. Maize crops using the controlled-release ammonium phosphate fertilizer had an additional 10~35% of yield more than one using the conventional ammonium phosphate fertilizer, thus the present use efficiency for the growth season of the nitrogen and phosphorus nutrients increased relative to previous fertilizers.

The controlled-release ammonium phosphate fertilizer was also applied to pot plants in equal weight with the conventional ammonium phosphate fertilizer. This experiment showed the use efficiency of phosphorus has been raised an additional 5~35% and the use efficiency of nitrogen has been raised an additional 5~38%. In the structure analysis, the controlled-release ammonium phosphate fertilizer had lower degree of crystallization than the conventional ammonium phosphate fertilizer that directly reflects the increase of use efficiency. Infrared spectrum analysis indicates that the release-controlling material is combined with the $NH_4^+$ and $H_nPO_4$ groups of the ammonium phosphate by strong chemical bonding and causes covalent bonding to enhance the anti-leaching capability and prolong the releasing period.

According to the above description, several advantages of the present invention are obtained:

1. All release-controlling materials used in the present invention are agricultural waste and useless before, but in the present invention enhance the use efficiency and also to reduce the product cost of the controlled-release ammonium phosphate. Thus, this invention provides a new way for conversion of the industrial and agricultural waste into resources.

2. The controlled-release ammonium phosphate fertilizer has excellent anti-fixing capability to increase use efficiency and further increase crop yields. Additionally, the controlled-release ammonium phosphate fertilizer also has excellent anti-leaching capability to avoid water eutrophication and thus is environmentally friendly.

3. No extra equipment is needed for producing the controlled-release ammonium phosphate fertilizer, thus existing apparatus can be used to produce the controlled-release ammonium phosphate fertilizer and thereby to reduce both of equipment cost and operation cost.

Although the invention has been explained in relation to its preferred embodiment, many other possible modifications and variations can be made without departing from the spirit and scope of the invention as hereinafter claimed.

What is claimed is:

1. A method for making controlled-release ammonium phosphate fertilizer comprising following steps:

adding release-controlling materials into ammonium phosphate slurry, wherein the amount of the release-controlling materials is 3-35 wt % of the dry weight of the ammonium phosphate slurry;

mixing evenly the ammonium phosphate slurry and the release-controlling materials into a mixture;

condensing the mixture of the ammonium phosphate slurry and the release-controlling materials until a water-content rate of the mixture reaches 25-35% w/w, based on a dry weight of the ammonium phosphate slurry; and granulating the condensed mixture of the ammonium phosphate slurry and the release-controlling materials to obtain granular controlled-release ammonium phosphate fertilizer.

2. The method as claimed in claim 1, wherein sulfuric acid is further added to the mixture of the ammonium phosphate and the release-controlling material to acidify the mixture before condensing;

wherein the sulfuric acid is 1-20% w/w, based on the dry weight of the ammonium phosphate slurry.

3. The method as claimed in claim 1, wherein the release-controlling material is selected from at least one of the group comprising: zeolite, montmorillonite, pillared montmorillonite, and lignin comprising alkali lignin and lignosulfonate or lignosulphonate.

4. The method as claimed in claim 2, wherein the release-controlling material is selected from at least one of the group comprising: acidified zeolite, acidified montmorillonite, acidified pillared montmorillonite, and acidified lignin comprising acidified alkali lignin and acidified lignosulfonate or lignosulphonate.

5. The method as claimed in claim 1, wherein the granulating methods are selected from the following methods comprising: slurry granulating, spray granulating, and fluidization granulating.

6. The method as claimed in claim 3, wherein the granulating methods are selected from following methods comprising: slurry granulating, spray granulating, and fluidization granulating.

7. The method as claimed in claim 4, wherein the granulating methods are selected from following methods comprising: slurry granulating, spray granulating, and fluidization granulating.

8. A method for making controlled-release ammonium phosphate fertilizer comprising following steps:

adding release-controlling material and water into ammonium phosphate powder;

mixing evenly the ammonium phosphate powder, the release-controlling material and water into a mixture;

grinding the mixture;

activating the components in the mixture by piling;

drying the activated mixture to achieve the controlled-release ammonium phosphate fertilizer, wherein the release controlling material is selected from at least one of the group comprising: zeolite, montmorillonite, pillared montmorillonite, and lignin comprising alkali lignin and lignosulfonate or lignosulphonate and wherein the release controlling materials are in proportion of 3-35% w/w, based on a weight of the ammonium phosphate powder and the water is in proportion of 3-40% w/w, based on the weight of the ammonium phosphate powder.

9. A method for making controlled-release ammonium phosphate fertilizer comprising following steps:

adding release-controlling material and water into ammonium phosphate powder;

mixing evenly the ammonium phosphate powder, the release-controlling material and water into a mixture;

grinding the mixture;

activating the components in the mixture by piling;

drying the activated mixture to achieve the controlled-release ammonium phosphate fertilizer, wherein the release controlling material is selected from at least one of the group comprising: acidified zeolite, acidified montmorillonite, acidified pillared montmorillonite, and acidified lignin comprising acidified alkali lignin and acidified lignosulfonate or lignosulphonate, and wherein the release-controlling materials are proportion of 3-35% w/w, based on a dry weight of the ammonium phosphate powder and the water is in the proportion of 3-40% w/w, based on the dry weight of the ammonium phosphate powder.

* * * * *